C. G. NAYLOR.
PIPE ELBOW FORMING MACHINE.
APPLICATION FILED DEC. 27, 1909.
1,032,152.
Patented July 9, 1912.
5 SHEETS—SHEET 1.
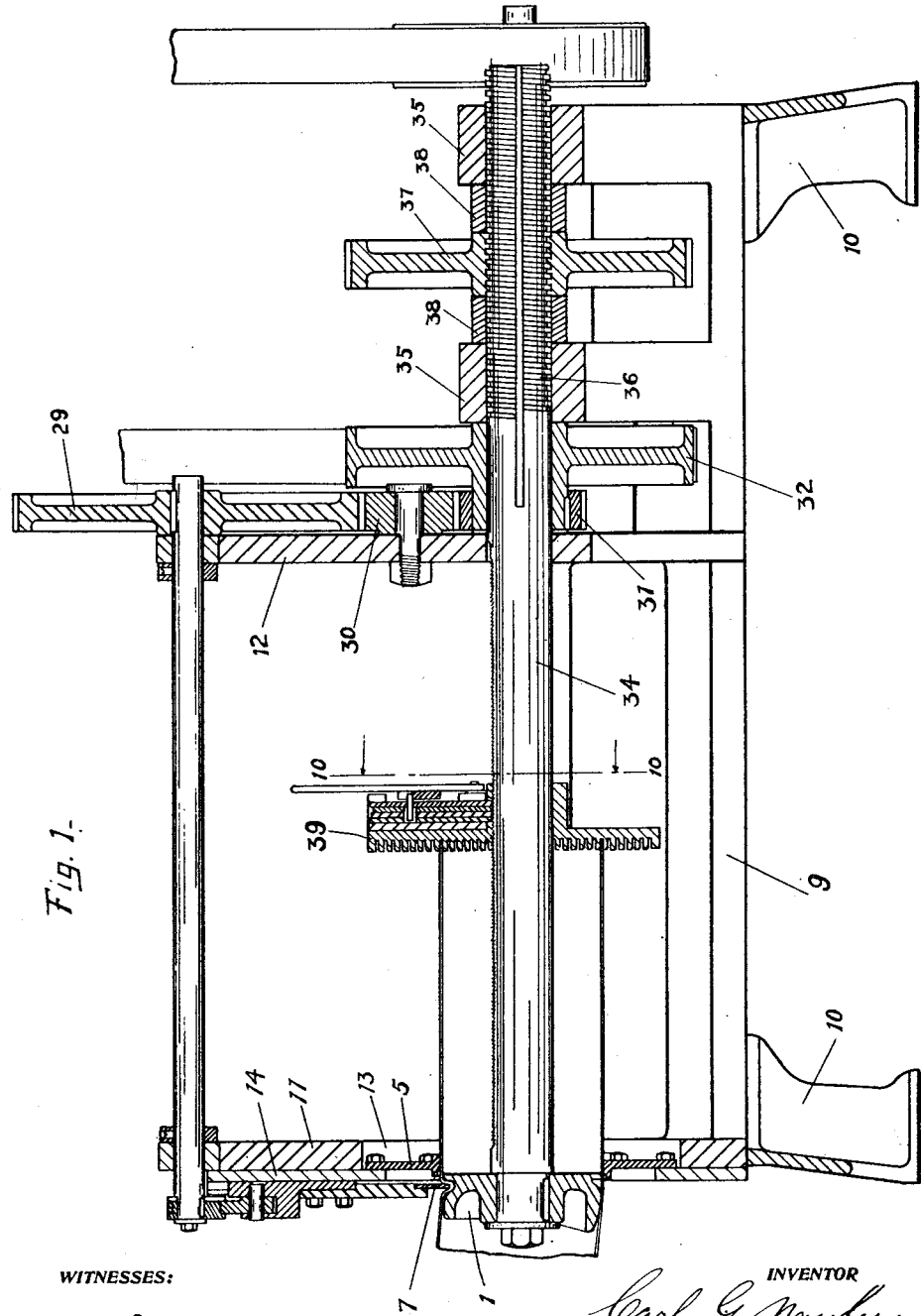

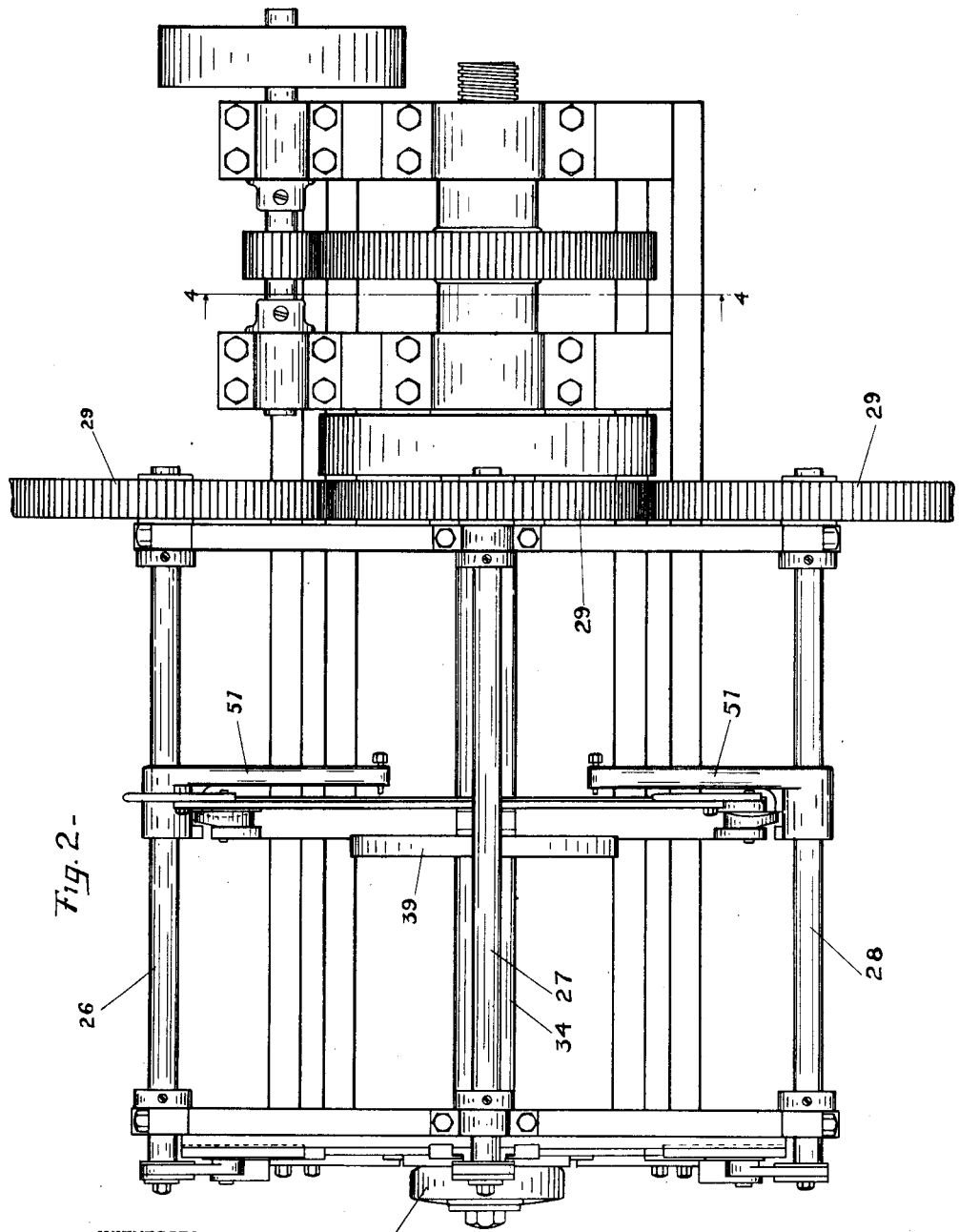

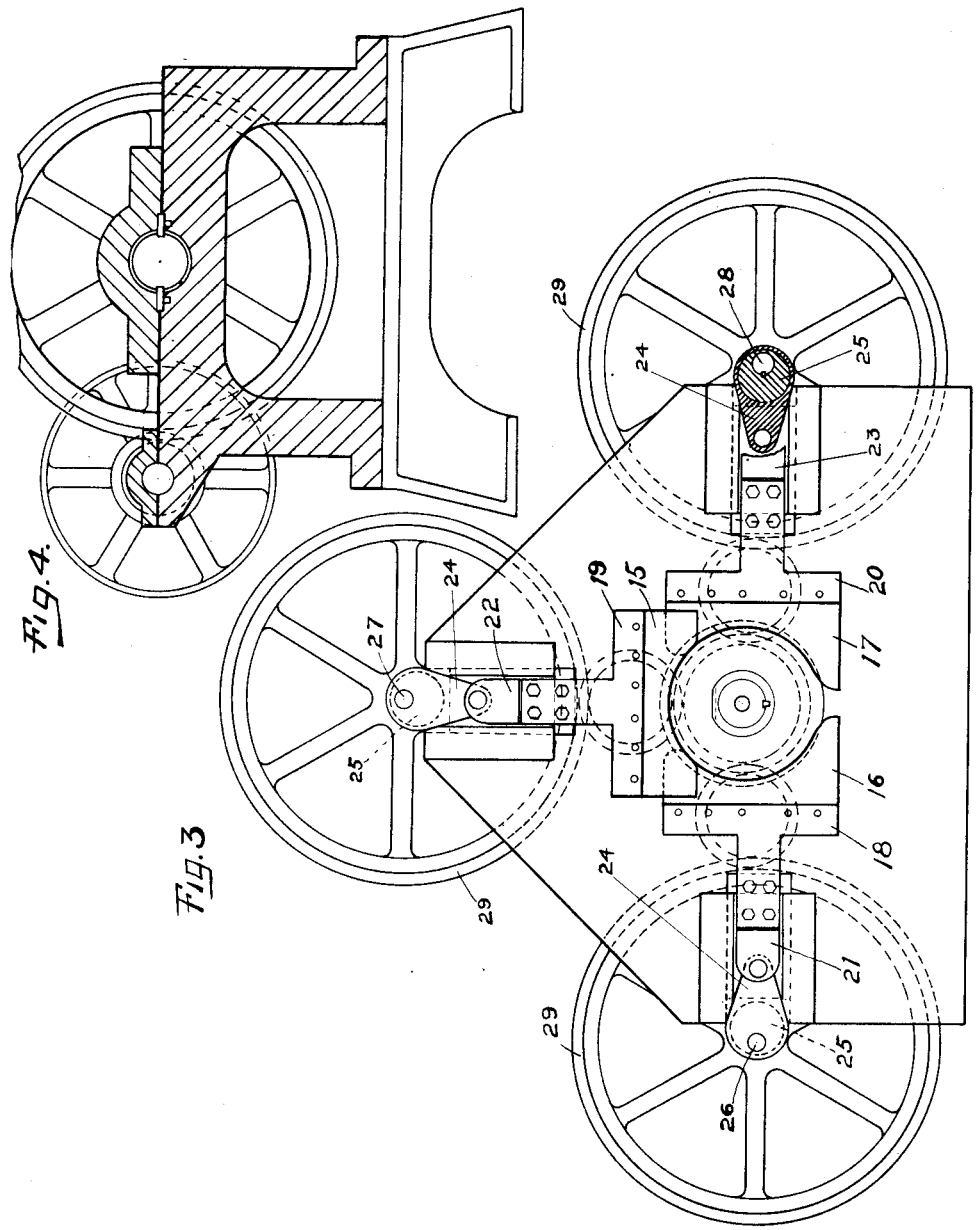

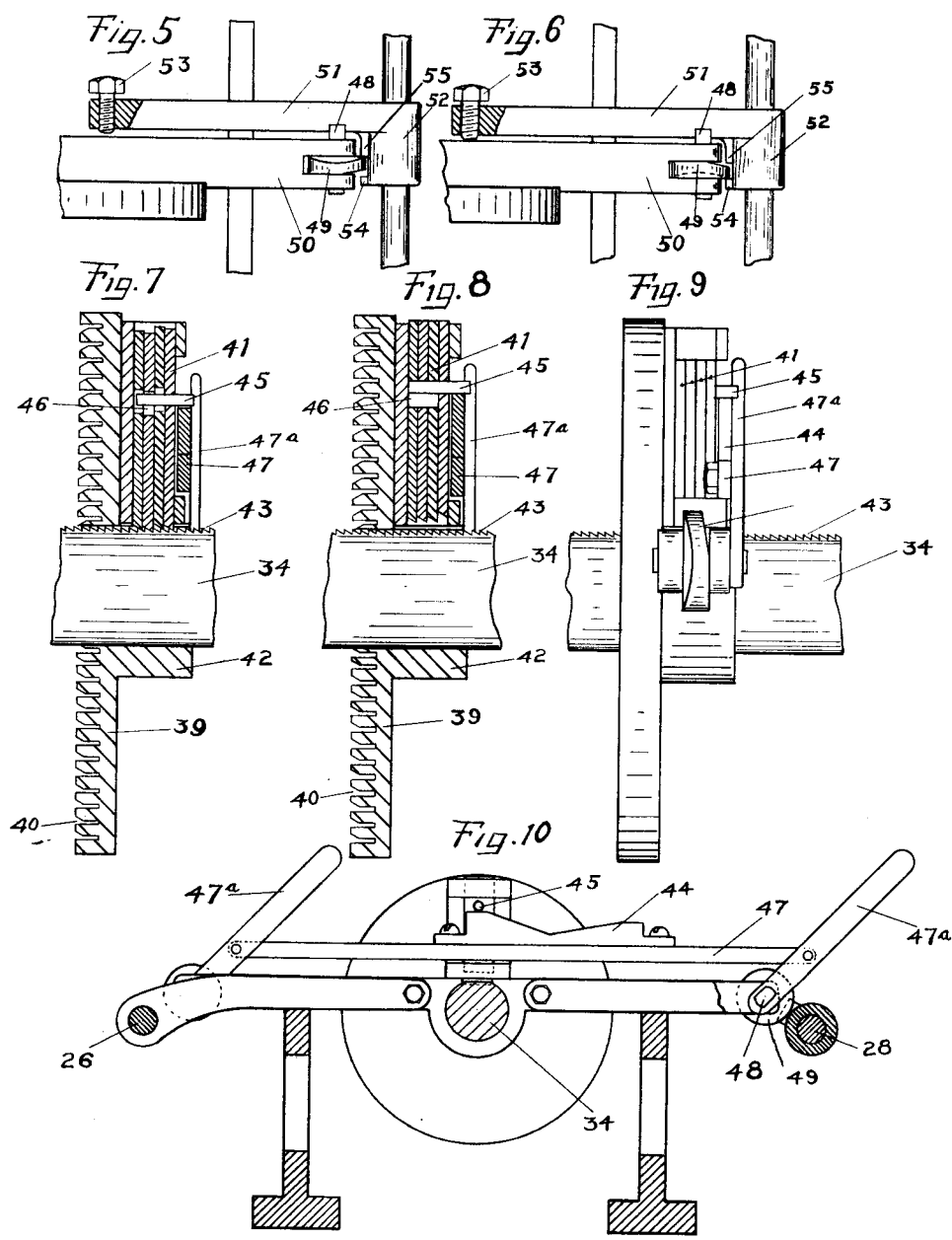

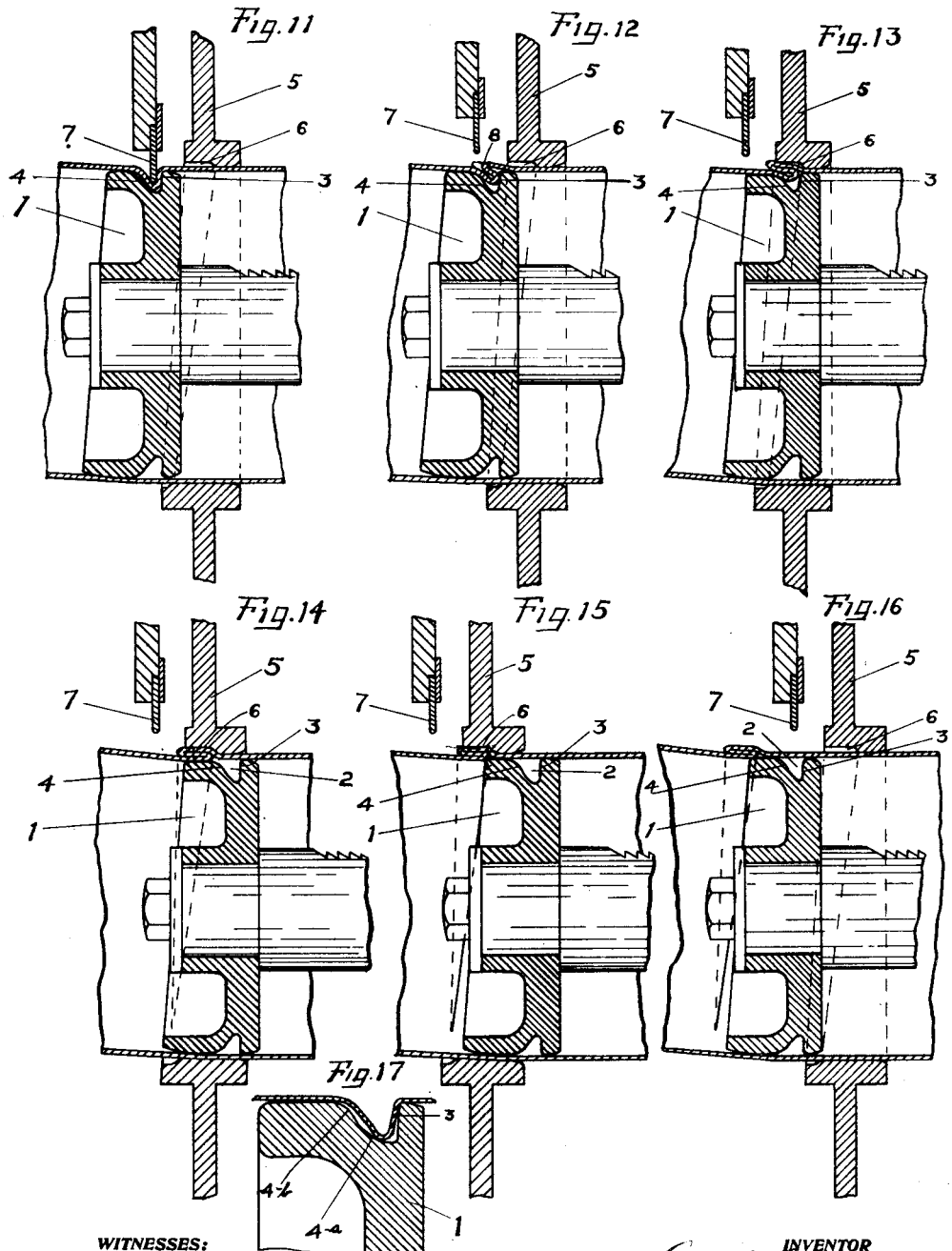

UNITED STATES PATENT OFFICE.

CARL G. NAYLOR, OF CHICAGO, ILLINOIS, ASSIGNOR TO AMERICAN SHEET METAL ELBOW COMPANY, OF WILMINGTON, DELAWARE, A CORPORATION OF DELAWARE.

PIPE-ELBOW-FORMING MACHINE.

1,032,152.     Specification of Letters Patent.     Patented July 9, 1912.

Application filed December 27, 1909. Serial No. 535,116.

*To all whom it may concern:*

Be it known that I, CARL G. NAYLOR, a citizen of the United States, residing at Chicago, in the county of Cook and State of Illinois, have invented new and useful Improvements in Pipe-Elbow-Forming Machines, of which the following is a full, clear, concise, and exact description, reference being had to the accompanying drawing, forming a part of this specification.

My invention relates to improvements in pipe elbow forming machines.

One of the objects of my invention is to provide a machine which will, by merely changing the dies, form elbows from pipes of varying diameters.

Another object of my invention is to provide a machine by which, without the change of parts, the radius of the elbow may be varied.

Another object of my invention is to provide a machine which may be used to operate on pipes having large diameters, also to provide a machine which may be used to operate on pipes formed of heavy material.

In manufacturing elbows of pipes of large diameters which have short turns, it is necessary to make the crease or crimp very deep, whereby the proper inclination to the elbow will be given. It has been found, in attempting to work on heavy material, that when the crimp is laid down, it tends to crack or split. It has also been found, in making elbows having sharp turns from pipes of large diameters, that it is necessary to make the crimp so deep that when the crimp is laid over the metal the crimp will tend to split or crack. Furthermore, under these circumstances, the portion of the pipe extending between the crimp and the holding or gripping means will buckle under the pressure applied in turning back or laying down the crimp.

It is one of the objects of my invention to provide a machine by which I may eliminate all of the above objections in forming pipe elbows.

For the purpose of disclosing my invention I have illustrated a practical embodiment thereof in the accompanying drawings.

In said drawings—Figure 1 is a longitudinal sectional view of the machine embodying my invention; Fig. 2 is a top plan view thereof; Fig. 3 is a front elevation thereof; Fig. 4 is a transverse section taken on the lines 4—4 of Fig. 2; Fig. 5 is a detail plan of the carriage-holding device; Fig. 6 is a similar view showing the same in a different position; Fig. 7 is a sectional view of the carriage and its moving mechanism; Fig. 8 is a similar view with the dogs thrown out of operative position; Fig. 9 is a side elevation of the carriage; Fig. 10 is a sectional view on the line 10—10 of Fig. 1; Figs. 11 to 16 are detail views showing the various steps in the forming of a crimp; Fig. 17 is an enlarged sectional view of a portion of the plunger.

In order that the machine may be more intelligently understood, I will first describe the operation of forming a crimp by my machine, having particular reference to Figs. 11 to 16. In said figures it will be noticed that I provide a plunger die 1 provided with an annular recess 2, the front wall 3 of said recess being substantially straight and the rear wall 4 of said recess being inclined to form a wedge-shaped extension of the plunger. The taper of the wall varies as shown more clearly in Fig. 17. In this enlarged view it will be noted that the wall is only slightly inclined outwardly as shown at $4^a$ and that near the periphery of the plunger, as at $4^b$, the inclination is greater. This plunger is adapted to operate in a female die 5, having an annular shoulder 6 formed in the wall thereof. For forming the crimp suitable dies 7 operate upon the pipe. It will be understood that the dies 7 do not form a true circle, or in other words, are eccentric relatively to the center of the head 1, whereby the depth of the crease formed in the pipe will taper from the top around the sides. In the first step of forming the crimp the pipe is crimped or creased by the dies 7 operating thereupon and forcing the metal into the annular recess in the head 1. The crease thus formed is only about half the depth of the crimp intended to be made. After the crease or crimp has been formed the die 7 is withdrawn and the plunger moves rearwardly, the portion $4^a$ of the wedge-shaped wall 4 bearing on the crimp and slightly turning the same upwardly, and forcing the metal of the pipe outwardly as shown in Fig. 12. When the crimp has been formed to this extent the portion $4^b$ tends to force the metal rearwardly, and as the pipe is held against rearward movement by its carriage the metal at the point 8 commences to roll, thereby greatly increasing the depth of the crimp, as illustrated in Fig. 13. By the time the head 1 reaches the position illustrated in Fig. 13 the crimp has assumed the depth desired and the sloping shoulder 4ᵇ tends to force the crimp into the die 5. As the metal is forced in, it is practically held against further movement by the die 5 and the plunger and all of the strain of flattening the crimp is taken up between the plunger head and the die, so that none of the strain comes on the carriage, and the portion of the pipe between the dies and the carriage does not buckle. It will be noticed from Fig. 15 that the head passes through the female die sufficiently far to force the crimp outward, so that it assumes the form of what is known as an "outside crimp," whereby the interior of the pipe is left substantially smooth. After the crimp has been formed the head 1 is advanced, and with it the pipe, so that the pipe will assume the position illustrated in Fig. 16 for the next crimp.

Referring, now, to Fig. 1, in the embodiment of the machine illustrated, I provide a base 9, mounted on suitable legs 10, on which all of the parts of the machine are carried. Extending vertically from the base 9 is a pair of uprights 11 and 12. The upright 11 is provided with a central opening 13, and fastened to the front face of the upright is a plate member 14 having a similar central opening. Secured to the front plate 14 is the female die 5. The crimping die 7 is mounted on the front plate 14 and is formed of three independently operated sections 15, 16 and 17. I have, for the purpose of description, referred to the three sections as one die. They may, however, be considered as separate dies. The dies are mounted, respectively, on reciprocating heads 18, 19 and 20, which are connected to reciprocating plungers 21, 22 and 23 mounted in suitable guides. These plungers are each connected by a link 24 with an eccentric 25 mounted on each of the shafts 26, 27 and 28. These shafts are journaled in the front and back plates 11 and 12 and are driven by suitable gears 29 adapted to mesh with idlers 30, which in turn mesh with a pinion 31 mounted on a hub of a driving pulley 32, loosely mounted upon the shaft or mandrel 34. By this arrangement the three sections of the dies are driven from independent shafts and greater power may thereby be applied. Extending upwardly from the rear end of the base 9 are a pair of journals 35 in which is supported the mandrel 34 for the head 1, the head 1 being removably secured thereto to permit the substitution of heads of different size. The rear end of the mandrel is screw-threaded at 36, and has mounted thereon a gear-wheel 37 screw-threaded to receive the threads. The mandrel is keyed in its journals against rotation, and on either side of the gear-wheel 37 is provided a stop collar 38 whereby, when the gear is rotated in one direction, the screw will feed the mandrel forward, and when the rotation of the gear is reversed the horizontal movement of the mandrel will be reversed. By this arrangement I avoid the necessity of a regular step by step mechanism for feeding the pipe forward, and am therefore enabled to feed the pipe forward to any extent I desire, which permits the spacing of the crimps at will and consequently varying the radius of the turn. The rear end of the pipe is supported by a carriage 39 in the form of a disk having in the front face thereof annular groove 40 to receive the different sized pipes to be operated upon. It will be noted in connection with this carriage that I merely support the rear end of the pipe and do not provide means for positively gripping the pipe. This is particularly advantageous in forming crimps in heavy metal, as it permits the metal to draw slightly to the front, whereby the shearing of the pipe at the point where the crimp is made is prevented. The carriage is moved forward with the mandrel 34 by one of the gang of dogs 41 mounted in a suitable support on the rear of the carriage and adapted to extend through the hub 42 thereof to engage notches or teeth 43 formed on the mandrel. I have found, in practice, that a tooth not less than a quarter of an inch is desirable, in order that the tooth may be of sufficient strength to stand the strain of moving the carriage forward. Therefore, in order to get as little lost motion as possible, I have provided a series of dogs,—in this instance four,—so spaced that only one of the same will drop into a tooth at a time. By this means I get the same effect as if the teeth on the mandrel were smaller and retain the advantage of having a tooth large enough to withstand the strain placed thereon. These dogs are raised at will to permit the carriage to be moved freely when desired, as when inserting a new pipe, by a cam 44 which engages a pin 45 adapted to enter slots 46 in the dogs. The cam is mounted on a transversely extending bar 47 pivoted to handles 47ᵃ which are connected at their lower ends to the spindles 48 of the pair of cams 49 mounted on a pair of transversely extending arms 50 secured on the rear of the carriage 39. The carriage is held against the rearward movement during the process of forming the crimp by means of a pair of inwardly extending arms 51 which are provided with hubs 52 adapted to have a sliding fit on the shafts 26 and 28. The inner ends of these arms are each provided with an adjustable screw 53 which bears on the inner portion of the arms 50. Therefore, it will be noted when any strain is placed on the carriage the inner ends of the arms will be forced to the rear, which will cause the hubs 52 to bind on the shafts and thereby hold the arms, and with them the carriage, against rearward movement. The cams 49 are adapted to engage stops 54 and 55 on the hubs 52. During the process of forming a crimp the cams are rotated so that they bear on the stops 54. Therefore, when the carriage is moved forward these cams will engage these stops and carry with them the arms 51. By this arrangement, while the arms 51 are at perfect liberty to move forward, as before stated, when any pressure is placed upon the carriage the inner end of the arm will be forced to the rear, thereby locking the hub on the shaft and preventing the arm, and with it the carriage, from moving backward. When it is desired to move the carriage backward to insert a new pipe, the cams 49 are rotated by the handles 47ª so that they engage the stops 55, which being near the point of support will unlock the friction clutches and the hubs 52 will be free to move on the shaft. By connecting the handles 47 with the spindles of the cams 49 the cams are thrown into position to cause the arms to be freely movable rearwardly on the shafts when the dogs 41 are raised.

While I have shown and described one embodiment of my invention in the accompanying drawings and specification, it will be understood that various modifications and changes may be made therein without departing from the spirit of my invention as set forth in the appended claims.

Having thus described my invention what I claim as new and desire to secure by Letters Patent is:

1. In a pipe elbow forming machine, the combination with means for forming a crimp, of means for bending the crimp and moving one portion thereof relative to the other to increase the length of the walls of the crimp.

2. In a pipe elbow forming machine, the combination with means for forming a crimp, of means for bending the crimp, and moving one portion of the crimp relatively to the other to increase the length of the walls thereof and for flattening the crimp.

3. In a pipe elbow forming machine, the combination with means for forming the crimp, of means for rolling a portion of the metal under to increase the length of the walls of the crimp.

4. In a pipe elbow forming machine, the combination with means for forming a crimp, of means for bending the crimp over and rolling the metal under to increase the length of the walls of the crimp and for flattening the crimp.

5. In a pipe elbow forming machine, the combination with means for forming a crimp, of means for increasing the length of the walls of the crimp after the same has been partially turned.

6. In a pipe elbow forming machine, the combination with means for forming a crimp, of means for increasing the length of the walls of the crimp after the same has been partially turned, and for flattening the crimp.

7. In a pipe elbow forming machine, the combination with means for forming a crimp, of a female die having an opening therein and an annular shoulder formed on the wall of said opening, and a plunger having an annular recess therein, one wall of said recess being substantially straight and the other tapered.

8. In a pipe elbow forming machine, the combination with means for forming a crimp of a reciprocating member for turning said crimp, and a threaded connection between said member and the driving mechanism therefor.

9. In a pipe elbow forming machine, the combination with means for forming a crimp, of a reciprocating shaft, a pipe carriage arranged to move in one direction with said shaft and remain stationary when the shaft is moved in an opposite direction, said shaft having a threaded connection with a driving mechanism, and a crimp turning device carried by said shaft.

10. In a pipe elbow forming machine, the combination with means for forming a crimp, of a reciprocating shaft, crimp turning means mounted on said shaft, a pipe carriage arranged to be connected and disconnected with a portion of said shaft, a portion of said shaft being threaded, a gear nut on said threaded portion and means for holding said nut against lateral movement.

11. In a pipe elbow forming machine, the combination with means for forming a crimp, of a reciprocating shaft, means mounted on said shaft for turning the crimp, said shaft having ratchet teeth thereon, a pipe carriage, and a plurality of dogs on said carriage for engagement with said teeth, said dogs being so spaced that only one of the same will engage a tooth at a time.

12. In a pipe elbow forming machine, the combination with means for forming a crimp, of a reciprocating shaft, crimp turning means mounted on the front end of said shaft, said shaft having ratchet teeth formed thereon, a pipe carriage, a plurality of dogs on said carriage for engagement with said teeth, said dogs being so spaced that only one dog at a time will engage the teeth, and a threaded connection between said shaft and the driving mechanism.

13. In a pipe elbow forming machine, the combination with means for forming a crimp, of means for turning a crimp, a pipe carriage, and frictionally locked means for holding the carriage against movement during the turning of the crimp.

14. In a pipe elbow forming machine, the combination with means for forming a crimp, of means for turning a crimp, a pipe carriage, arms slidably mounted on rods for holding said carriage against movement during the turning of the crimp, means for causing the outer end of the arm to receive the pressure during the forming of a crimp to lock the arms against movement and means for engaging the arms near their supported point to permit the arms to move when desired.

15. In a pipe elbow forming machine, the combination with a die having a circular opening therein, a reciprocating head arranged to move into said opening and having an annular channel formed therein, and crimping dies for forcing the metal of the pipe into said channel, said crimping dies being spaced from the first-mentioned die a distance substantially equal to the difference between the depth of the crimp formed by the crimping dies and the width of the crimp to be formed in the pipe.

16. In a pipe elbow forming machine, the combination with a die having a circular opening therein, an annular shoulder formed on the wall of said opening, a reciprocating head arranged to move in said opening and having an annular channel formed therein, and crimping dies for forcing the metal of the pipe into said channel, said crimping dies being spaced from the first-mentioned die a distance substantially equal to the difference between the depth of the crimp formed by said dies and the depth of crimp to be formed in the pipe.

17. In a pipe elbow forming machine, the combination with a die having a circular opening therein, a reciprocating head arranged to move into said opening and having an annular channel, one wall of which is inclined, and crimping dies for forcing the metal of the pipe into said channel, said crimping dies being spaced from the first-mentioned die a distance substantially equal to the difference between the depth of the crimp formed by said dies and the depth of crimp to be formed in the pipe.

18. In a pipe elbow forming machine, the combination with a die having a circular opening therein, of a shoulder formed on the wall of said opening, a reciprocating head arranged to move in said opening having an annular channel formed therein, one wall of which is inclined, and crimping dies for forcing the metal of the pipe into said channel, said crimping dies being spaced from the first-mentioned die a distance substantially equal to the difference between the depth of the crimp formed by said dies and the depth of the crimp to be formed in the pipe.

19. In a pipe elbow forming machine, the combination with crimpers, of a reciprocating crimp bender arranged to engage the pipe and move one portion thereof relatively to the other to increase the length of the walls of the crimp.

20. In a pipe elbow forming machine, the combination with crimpers, of a crimp bender and flattener arranged to engage the crimp and move one portion of the pipe relatively to the other to increase the length of the walls of the crimp.

21. In a pipe elbow forming machine, the combination with crimpers, of a crimp bender arranged to engage the crimp and roll a portion of the metal of the pipe under the pipe to increase the length of the walls of the crimp.

22. In a pipe elbow forming machine, the combination with crimpers, of means for turning a crimp, a pipe carriage, and an arm slidably mounted on a rod, arranged at its outer end to engage the carriage to hold the carriage against movement during the turning of the crimp.

In witness whereof, I have hereunto subscribed my name in the presence of two witnesses.

CARL G. NAYLOR.

Witnesses:
 E. P. KING,
 W. PERRY HAHN.